(12) United States Patent
Barnett et al.

(10) Patent No.: US 8,957,309 B2
(45) Date of Patent: Feb. 17, 2015

(54) DEFORMABLE SEAL INTEGRATED WITH PACKAGE LID

(75) Inventors: Ron Jay Barnett, Santa Rosa, CA (US); Gregory Stephen Gonzales, Sebastopol, CA (US)

(73) Assignee: National Instruments Corporation, Austin, TX (US)

( * ) Notice: Subject to any disclaimer, the term of this patent is extended or adjusted under 35 U.S.C. 154(b) by 873 days.

(21) Appl. No.: 13/193,419

(22) Filed: Jul. 28, 2011

(65) Prior Publication Data
US 2012/0152956 A1    Jun. 21, 2012

Related U.S. Application Data

(60) Provisional application No. 61/423,955, filed on Dec. 16, 2010.

(51) Int. Cl.
*H05K 5/06*    (2006.01)
*G01D 11/24*    (2006.01)

(52) U.S. Cl.
CPC ..................... *G01D 11/24* (2013.01)
USPC ...................... 174/50.51; 174/564

(58) Field of Classification Search
CPC .................................................. H05K 5/061
USPC .................. 174/564, 17 CT, 50.51
See application file for complete search history.

(56) References Cited

U.S. PATENT DOCUMENTS

| | | | | |
|---|---|---|---|---|
| 5,550,712 A * | 8/1996 | Crockett | ......................... | 361/752 |
| 5,786,548 A * | 7/1998 | Fanucchi et al. | ........... | 174/50.54 |
| 6,111,199 A * | 8/2000 | Wyland et al. | ................... | 174/18 |
| 6,301,097 B1 * | 10/2001 | Ellsworth et al. | ............. | 361/728 |
| 6,590,158 B1 * | 7/2003 | Schilling et al. | .............. | 174/564 |
| 8,053,668 B2 * | 11/2011 | Lai et al. | .......................... | 174/50 |
| 8,093,512 B2 * | 1/2012 | Chen et al. | ..................... | 174/523 |
| 8,466,377 B2 * | 6/2013 | Dai | ............................... | 174/561 |
| 8,519,264 B2 * | 8/2013 | Leslie et al. | ..................... | 174/50 |
| 8,530,760 B2 * | 9/2013 | Taylor | ............................ | 174/563 |
| 2008/0053700 A1 * | 3/2008 | O'Connor et al. | ............ | 174/564 |
| 2008/0087463 A1 * | 4/2008 | Ingenbleek et al. | .......... | 174/564 |
| 2009/0084782 A1 * | 4/2009 | Helmer | ......................... | 220/3.8 |

* cited by examiner

*Primary Examiner* — Hung V Ngo
(74) *Attorney, Agent, or Firm* — Meyertons Hood Kivlin Kowert & Goetzel, P.C.; Jeffrey C. Hood; Stephen A. Mason

(57) ABSTRACT

A measurement apparatus is disclosed. The measurement apparatus includes a lid configured to be removably affixed to a case. The lid is formed from a substrate composed of a first material. An interior surface of the lid includes a surface coating of a second material. A raised seal is affixed to the substrate and extends beyond the interior surface in a direction orthogonal to the interior surface. The raised seal includes an elastic deformable layer adjacent to the substrate. The raised seal also includes a surface conforming layer configured such that, when the lid is affixed to the case, the surface conforming layer is adjacent to the case along a side opposite the elastic deformable layer. The surface conforming layer is composed of a material of a yield strength less than a normal force generated by fixation of the lid to the case.

20 Claims, 12 Drawing Sheets

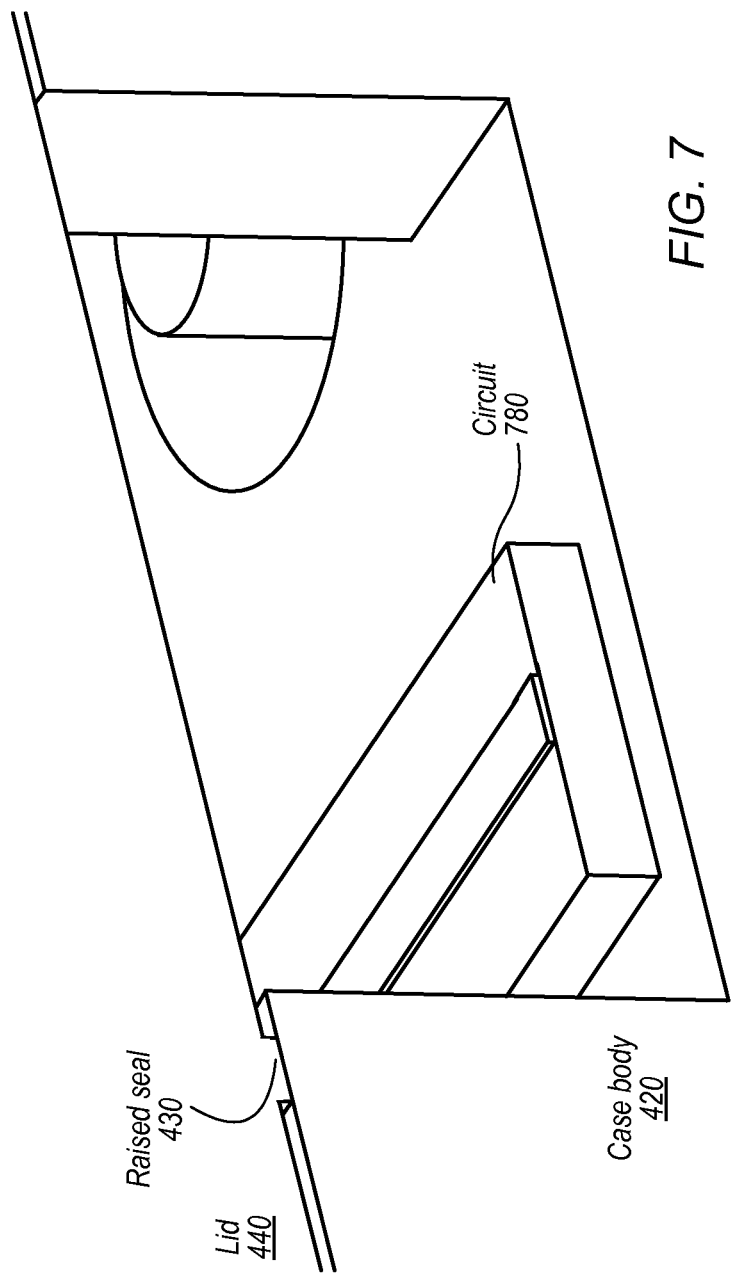

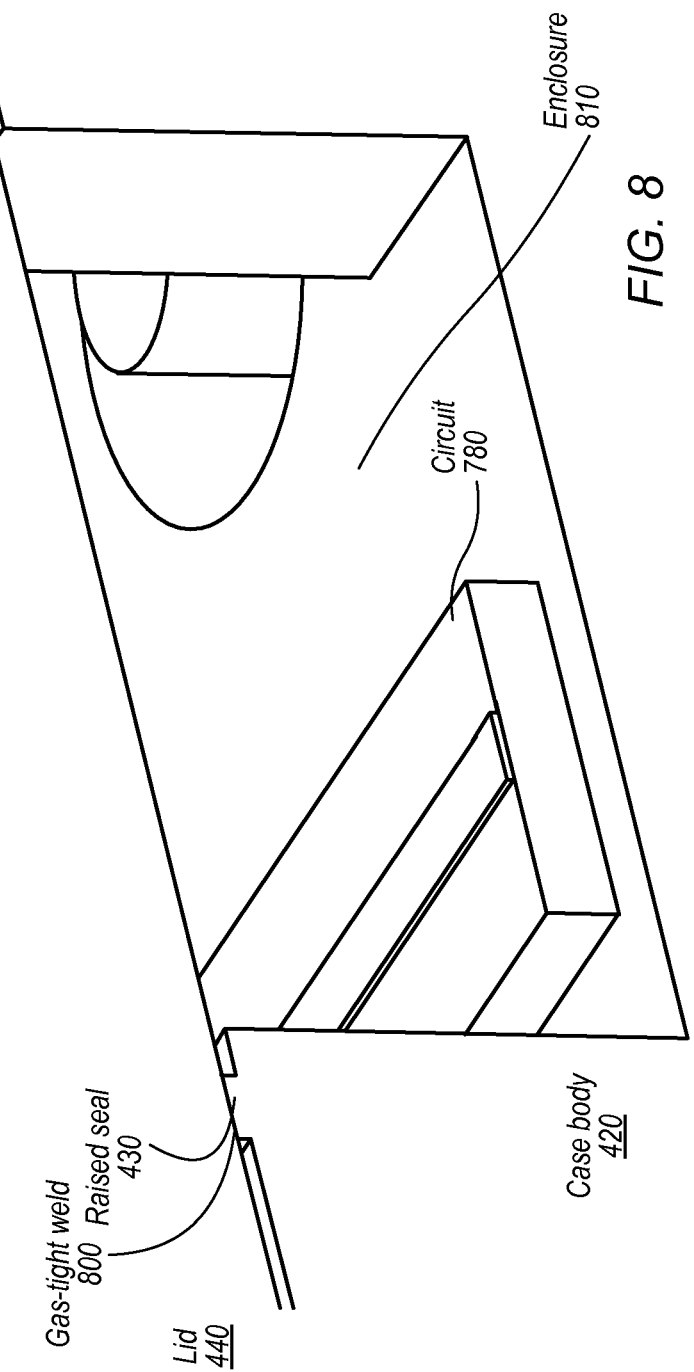

DEFORMABLE SEAL INTEGRATED WITH PACKAGE LID

CLAIM OF PRIORITY TO PROVISIONAL APPLICATION

This application claims benefit of priority of U.S. Provisional Application Ser. No. 61/423,955 entitled "Deformable Seal Integrated with Package Lid" filed Dec. 16, 2010, the content of which is incorporated by reference herein in its entirety.

FIELD OF THE INVENTION

The present invention relates to the field of measurement and data acquisition systems, and more particularly to a method and apparatus for providing a deformable seal integrated with a package lid.

DESCRIPTION OF THE RELATED ART

Scientists and engineers often use measurement systems to perform a variety of functions, including measurement of physical phenomena or behavior of a unit under test (UUT), test and analysis of physical phenomena, process monitoring and control, control of mechanical or electrical machinery, data logging, laboratory research, and analytical chemistry, to name a few examples.

A typical measurement system comprises a computer system with a measurement device or measurement hardware. The measurement device may be a computer-based instrument, a data acquisition device or board, a programmable logic device (PLD), an actuator, or other type of device for acquiring or generating data. The measurement device may be a card or board plugged into one of the I/O slots of the computer system, or a card or board plugged into a chassis, or an external device. For example, in a common measurement system configuration, the measurement hardware is coupled to the computer system through a PCI bus, PXI (PCI extensions for Instrumentation) bus, a GPIB (General-Purpose Interface Bus), a VXI (VME extensions for Instrumentation) bus, a serial port, parallel port, or Ethernet port of the computer system. The measurement system can be connected to a data source, which communicates with the measurement system.

Frequently, a need exists to package circuits associated with the measurement system in cases that can be opened and closed, but that provide an electromagnetic seal when closed.

SUMMARY OF THE INVENTION

A measurement apparatus is disclosed. The measurement apparatus includes a lid configured to be removably affixed to a case. The lid is formed from a substrate composed of a first material. An interior surface of the lid includes a surface coating of a second material. A raised seal is affixed to the lid substrate and extends beyond the interior surface in a direction orthogonal to the interior surface. The raised seal includes an elastic deformable layer adjacent to the substrate. The raised seal also includes a surface conforming layer configured such that, when the lid is affixed to the case, the surface conforming layer is adjacent to the case along a side opposite the elastic deformable layer. The surface conforming layer is composed of a material of a yield strength less than a normal force generated by fixation of the lid to the case.

BRIEF DESCRIPTION OF THE DRAWINGS

A better understanding of the present invention can be obtained when the following detailed description of the preferred embodiment is considered in conjunction with the following drawings, in which:

FIG. 7 illustrates a cutaway view of a microcircuit case with an installed circuit and a lid with an integrated deformable seal fitted to the case according to one embodiment of the present invention;

FIG. 8 depicts a cutaway view of an alternative embodiment a microcircuit case with an installed circuit and a lid with an integrated deformable seal fitted to the case according to one embodiment of the present invention;

Figure 1:
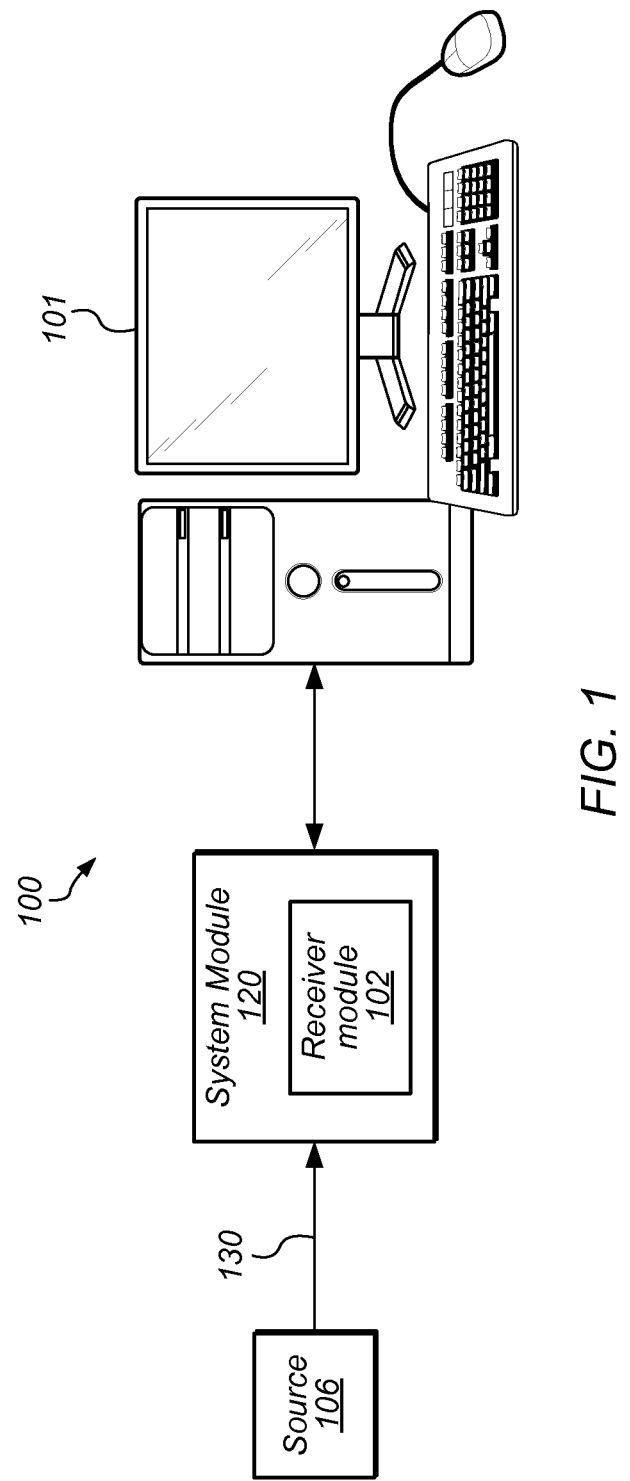
FIG. 1 illustrates a computer system configured to perform data acquisition functions compatible for use with an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Introduction to Package Lids with Integrated Deformable Seals.

In one embodiment, a measurement apparatus for use with radio-frequency signals includes a microcircuit situated inside a microcircuit case. The microcircuit case is sealed with a lid that is configured to be removably affixed on a side of the microcircuit case. The lid may be affixed to the microcircuit case, in some embodiments, using bolts penetrating through the lid. In one embodiment, such bolts are threaded such that turning the bolts using a measured and repeatable force to achieve full insertion and full affixation of the lid on the case generates a predictable and repeatable normal force between the lid and the case. The lid is formed from a substrate composed of a first material. In one embodiment, the lid is formed from a first material such as aluminum. An interior surface of the lid includes a surface coating of a second material. In some embodiments, the second material is gold (Au).

A raised seal is affixed to the substrate and extends beyond the interior surface in a direction orthogonal to the interior surface. The normal force between the lid and the case, described above, deforms the raised seal, as described below. The raised seal includes an elastic deformable layer adjacent to the substrate. In some embodiments, the elastic deformable layer is composed of a material that is the same material as the substrate. The raised seal also includes a surface conforming layer configured such that, when the lid is affixed to the case, the surface conforming layer is adjacent to the case along a side opposite the elastic deformable layer. The surface conforming layer is composed of a material of a yield strength less than a normal force generated by fixation of the lid to the case. In some embodiments, the surface conforming layer is composed of a soft metal conductor, such as gold or silver (Ag). Additionally, some embodiments include a middle layer composed of a soft metal conductor, such as copper (Cu) or silver. In some embodiments, the material used in the middle layer is of a greater compressive strength than the material in the surface conforming layer. Likewise, in some embodiments, the material used in the elastic deformable layer is of a yield strength greater than the yield strength of either the surface conforming layer or the middle layer.

In order to facilitate reclosable use of the lid described above, the lid is configured to be used with a normal force of attachment generated in the full affixation of the lid that is greater than the yield strength of the surface conforming layer, causing the surface conforming layer to permanently reshape through plastic deformation to the surface of the case to which the lid is attached. The elastic deformable layer, by contrast, is formed of a material of a yield strength greater than the normal force of attachment generated in the full affixation of the lid, but of a compressive strength less than the normal force of attachment generated in the full affixation of the lid, with the result that elastic deformation of the elastic deformable layer occurs at affixation of the lid and some recovery of the original shape of the elastic deformable layer occurs when the lid is removed from the case to which it was attached.

FIG. 1: Data Acquisition System

FIG. 1 is a diagram of one embodiment of a computer-based measurement system or data acquisition system 100. The data acquisition system 100 may comprise a computer system 101, which may be coupled to a measurement device, such as a radio receiver, referred to as radio frequency (RF) receiver module 102, through a communication medium 130. RF receiver module 102 may be an internal card or board coupled to a bus, e.g., a Peripheral Component Interconnect (PCI), PCI Express, Industry Standard Architecture (ISA), or Extended Industry Standard Architecture (EISA) bus, but is shown external to the computer 101 for illustrative purposes. RF receiver module 102 may also be an external device coupled to the computer system 101. In this embodiment, the communication medium 130 may be a serial bus, such as USB, IEEE 1394, MXI bus, Ethernet, or a proprietary bus, or a parallel bus such as GPIB or others. It is noted that the communication medium 130 may be a wired or wireless communication medium.

RF receiver module 102 may be integrated into a system module 120 coupled to an external source 106, such as an instrument, antenna, sensor, transducer, or actuator from which RF receiver module 102 may receive an input signal, e.g., an analog input such as sensor data. In one example embodiment, receiver module is contained in a case sealed with a lid including an integrated deformable seal, as described below. In one example, the external source 106 may be a radio frequency sensor, which is comprised in a unit under test (UUT). In this example, RF receiver module 102 may receive radio frequency analog signal reading data from the radio frequency sensor and convert the analog data to digital form to be sent to the computer system 101 for analysis. Additionally, RF receiver module 102 may receive a digital input, e.g., a binary pattern, from the external source 106 (e.g., a UUT). Furthermore, the RF receiver module 102 may also produce analog or digital signals, e.g., for stimulating the UUT.

Computer system 101 may be operable to control RF receiver module 102. For example, computer system 101 may be operable to direct RF receiver module 102 to perform an acquisition, and may obtain data from RF receiver module 102 for storage and analysis therein. Additionally, the computer system 101 may be configured to send data to RF receiver module 102 for various purposes, such as for use in generating analog signals used for stimulating a UUT.

The computer system 101 may include a processor, which may be any of various types, including an x86 processor, e.g., a Pentium™ class, a PowerPC™ processor, a CPU from the SPARC™ family of RISC processors, as well as others. Also, the computer system 101 may also include one or more memory subsystems (e.g., Dynamic Random Access Memory (DRAM) devices). The memory subsystems may collectively form the main memory of computer system 101 from which programs primarily execute. The main memory may be operable to store a user application and a driver software program. The user application may be executable by the processor to conduct the data acquisition/generation process. The driver software program may be executable by the processor to receive data acquisition/generation tasks from the user application and program RF receiver module 102 accordingly.

Exemplary Systems

Embodiments of the present invention may be involved with performing test and/or measurement functions and controlling and/or modeling instrumentation or industrial automation hardware. However, it is noted that embodiments of the present invention can be used for a plethora of applications and are not limited to the above applications. In other words, applications discussed in the present description are only examples, and embodiments of the present invention may be used in any of various types of systems. Thus, embodiments of the system and method of the present invention are configured to be used in any of various types of applications, including the operation and control of other types of devices such as multimedia devices, video devices, audio devices, telephony devices, Internet devices, radio frequency communication devices, etc.

Figure 2:
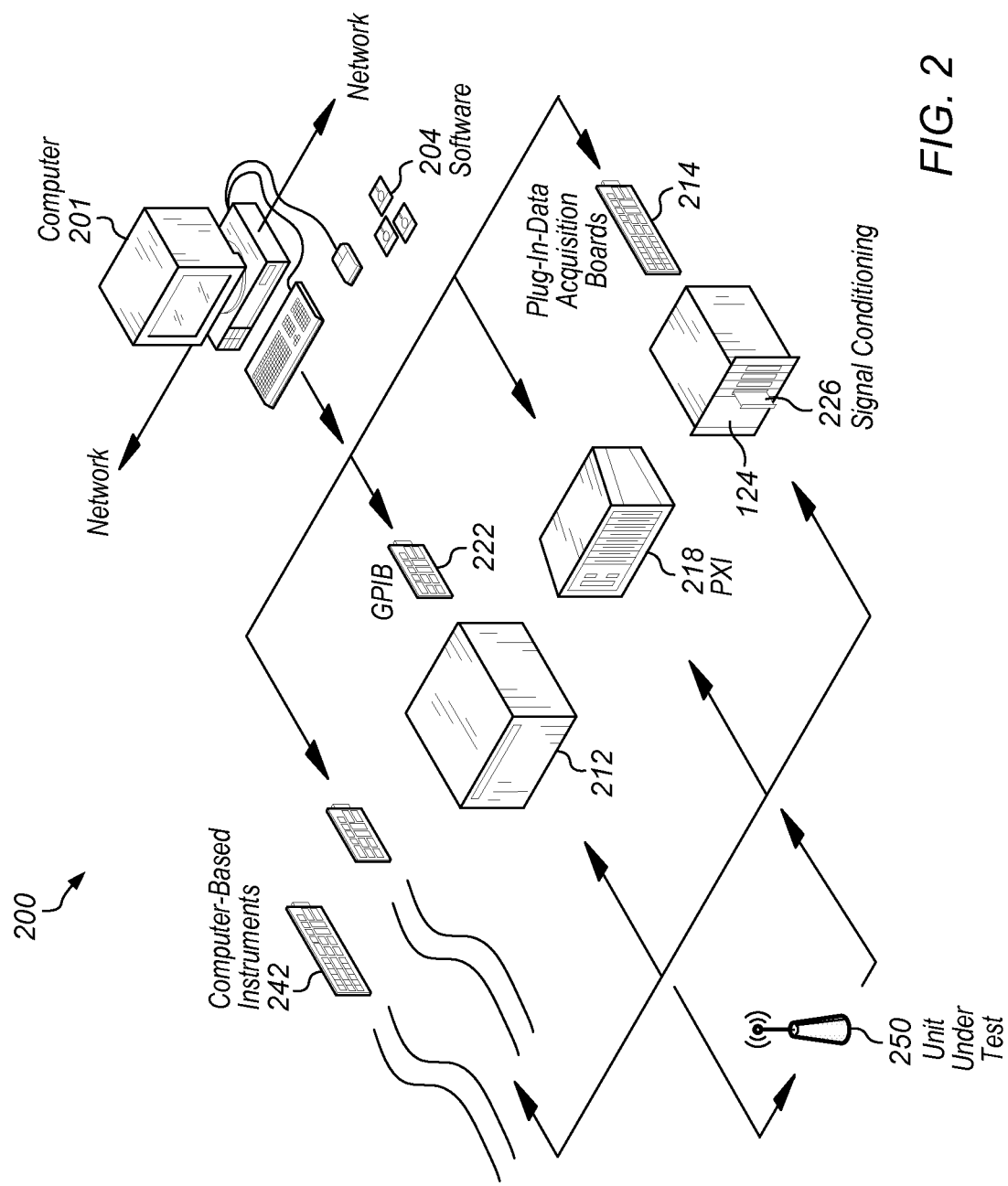
FIG. 2 depicts an instrumentation control system compatible for use with one embodiment of the invention.

FIG. 2 illustrates an exemplary instrumentation control system 200 which may use embodiments of the invention. The system 200 comprises a host computer 201 which couples to one or more instruments. The host computer 201 may comprise a CPU, a display screen, memory, and one or more input devices such as a mouse or keyboard as shown. The computer 201 may operate with the one or more instruments to analyze, measure or control a unit under test (UUT) 250 or other process (not shown). In one embodiment, the unit under test is monitored by a sensor coupled to a microcircuit in a circuit case with a lid including an integrated deformable seal, as described below.

The one or more instruments may include a GPIB instrument 212 and associated GPIB interface card 222, a data acquisition board 214 inserted into or otherwise coupled with chassis 224 with associated signal conditioning circuitry 226, a PXI instrument 218, and/or one or more computer based instrument cards 242, among other types of devices. The computer system may couple to and operate with one or more of these instruments. The instruments may be coupled to the unit under test (UUT) 250 or other process, or may be coupled to receive field signals, typically generated by transducers. Prior to transmission of data to computer 201, such field signals may be processed using a filter apparatus. The system 200 may be used in a data acquisition and control application, in a test and measurement application, an image processing or machine vision application, a process control application, a man-machine interface application, a simulation application, or a hardware-in-the-loop validation application, among others.

Figure 3:
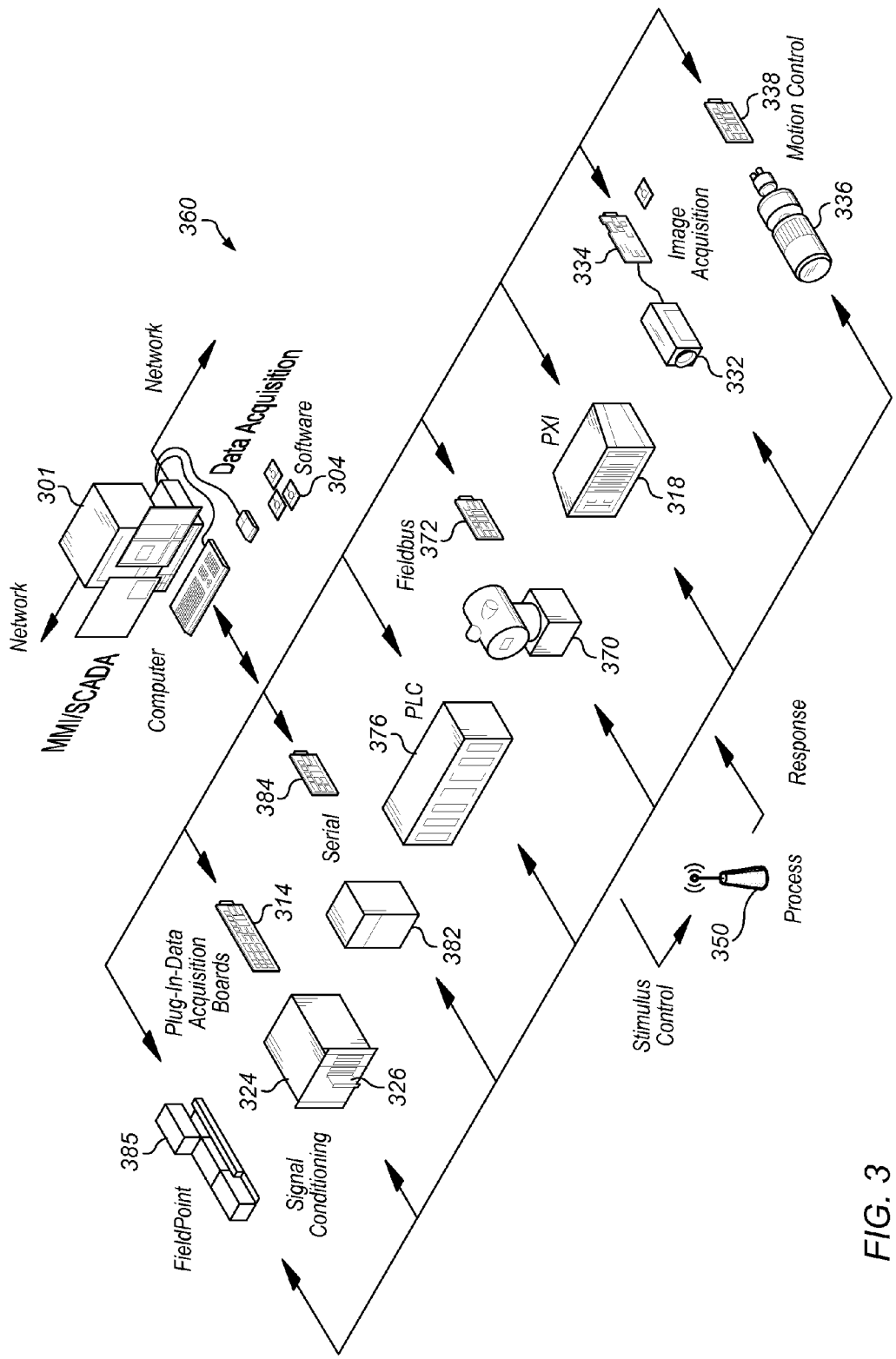
FIG. 3 illustrates an industrial automation system compatible for use with one embodiment of the invention.

FIG. 3 illustrates an exemplary industrial automation system 360 which may implement embodiments of the invention. The industrial automation system 360 is similar to the instrumentation or test and measurement system 200 shown in FIG. 2. The system 360 may comprise a computer 301 which couples to one or more devices or instruments. The computer 301 may comprise a CPU, a display screen, memory, and one or more input devices such as a mouse or keyboard as shown. The computer 301 may operate with the one or more devices to perform an automation function with respect to an RF process or device 350, such as MMI (Man Machine Interface), SCADA (Supervisory Control and Data Acquisition), portable or distributed data acquisition, process control, advanced analysis, or other control, among others.

The one or more devices may include a data acquisition board 314 inserted into or otherwise coupled with chassis 324 with associated signal conditioning circuitry 326, a PXI instrument 318, a video device 332 and associated image acquisition card 334, a motion control device 336 and associated motion control interface card 338, a fieldbus device 370 and associated fieldbus interface card 372, a PLC (Programmable Logic Controller) 376, a serial instrument 382 and associated serial interface card 384, or a distributed data acquisition system, such as the Fieldpoint system available from National Instruments, among other types of devices. The computer system may couple to and operate with one or more of these devices. The instruments may be coupled to the RF process or device 350 using a circuit in a case equipped with a lid configured with an integrated raised seal, or may be coupled to receive field signals, typically generated by transducers. Prior to transmission of data to computer 301, such field signals may be processed using a filter.

FIGS. 4-8 depict various embodiments of a lid equipped with an integral raised seal for attachment to a case housing a microcircuit. As discussed below, a microcircuit case with a lid is portrayed in FIG. 4.

Figure 4:
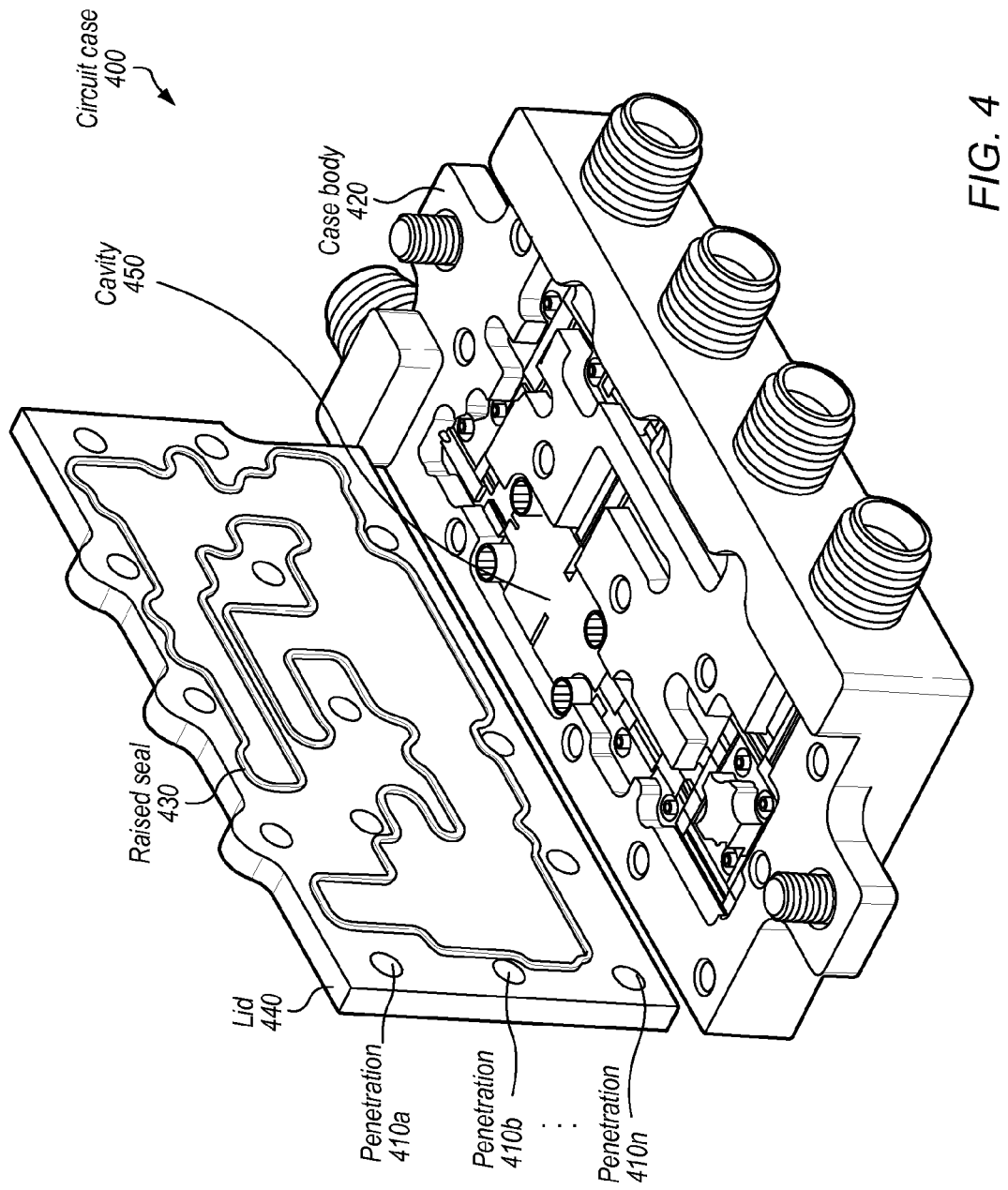
FIG. 4 depicts a receiver module case including a lid including an integrated deformable seal according to one embodiment of the present invention.

FIG. 4 depicts a receiver module case including a lid including an integrated deformable seal according to one embodiment of the present invention. Circuit case 400 includes a case body 400, which, in combination with a case lid 440, encloses a cavity 450 for housing a circuit (not shown). Penetrations 410a-410n are provided for the insertion of bolts to affix lid 440 to case body 420. A raised seal 430 extends along a continuous enclosure perimeter between lid 440 and case body 420. In one embodiment, the force used to attach lid 440 to case body 420 causes deformation of raised seal 430 as the force generated by bolts inserted through penetrations 410a-410n is translated to raised seal 430 by lid 440. In one embodiment, the force generated by bolts inserted through penetrations 410a-410n is sufficiently large to cause plastic deformation of some components of raised seal 430, but is sufficiently large only to cause elastic deformation of other components of raised seal 430.

In one embodiment, the raised seal 430 improves isolation of a circuit (not shown) in cavity 450 provided by case body 420 and lid 440 to prevent the leakage outside of the case of electromagnetic fields (EMF) from inside case body 420 created by the circuit resting in cavity 450. Further, in some embodiments described below, raised seal 430 provides a gas-tight seal for preventing gases outside of the case from entering cavity 450.

Figure 5A:
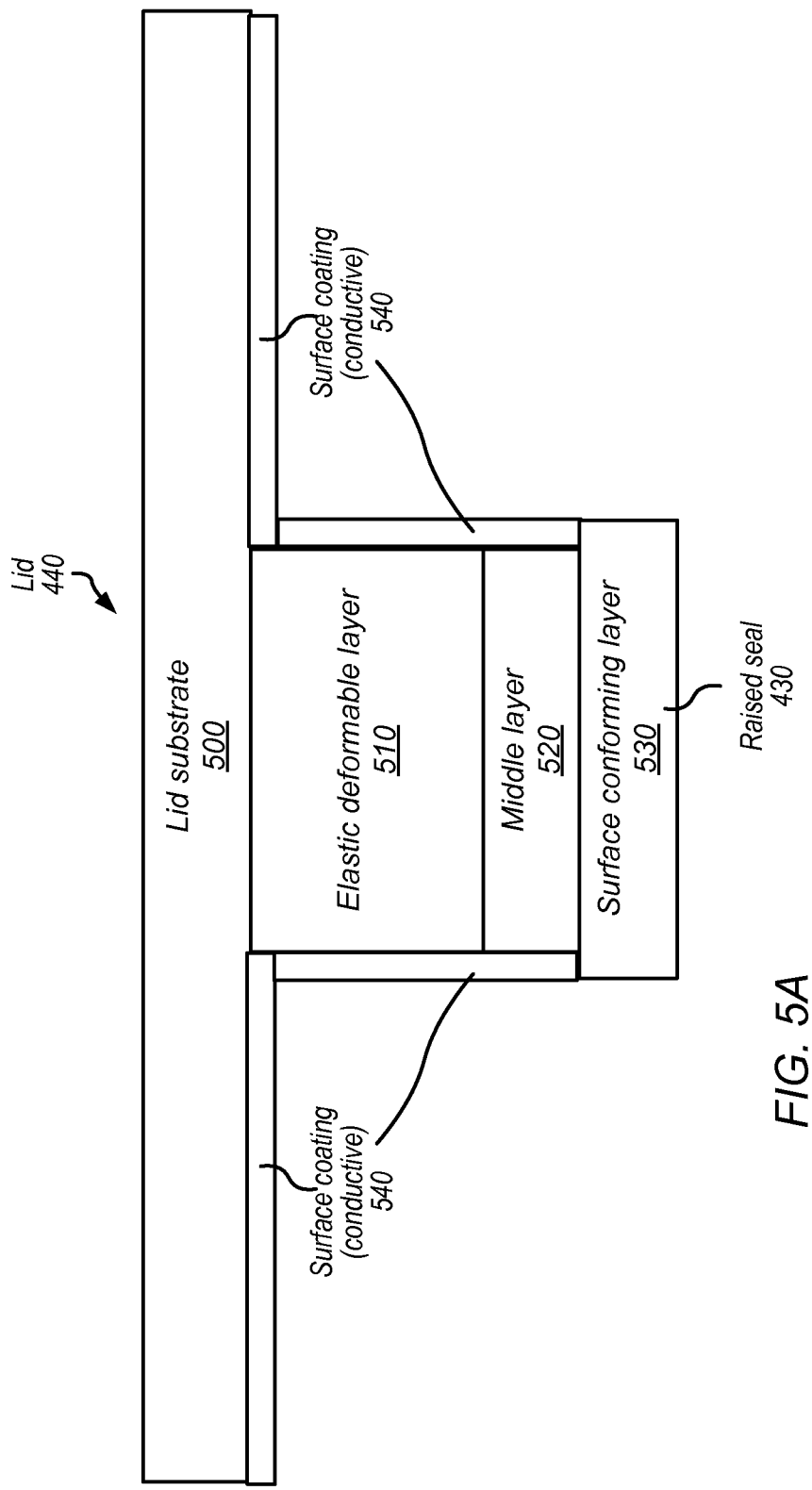
FIG. 5A illustrates a cross-section of a lid of a microcircuit case with an integrated deformable seal according to one embodiment of the present invention.

FIG. 5A illustrates a cross-section of a lid of a microcircuit case with an integrated deformable seal according to one embodiment of the present invention. As will be readily apparent to one of skill in the art in light of having read the present disclosure, for purposes of clarity in explanation, FIG. 5A is not drawn to scale. Lid 440 is composed of a lid substrate 500, a raised seal 430 affixed to lid substrate 500, and a conductive surface coating 540 affixed to lid substrate 500. Raised seal 430 is composed of an elastic deformable layer 510 affixed to lid substrate 500, a middle layer 520 affixed to elastic deformable layer 510, and a surface conforming layer 530 affixed to middle layer 520.

In one embodiment, surface conforming layer 530 is composed of gold or silver, which is selected for its low yield strength and high electrical conductivity. As used herein, yield strength is defined as the force necessary to cause plastic deformation of a material. Surface conforming layer 530 is designed to compress and conform under the normal force of attachment to a case body of lid 440 to any irregularities in the shape of the case body (not shown) to which lid 440 is attached, and to retain an imprint of the shape of that case body for subsequent re-attachment to the case body after removal of the case body. Middle layer 520 is composed of silver or copper, which is selected on the basis of having a yield strength higher than that of surface conforming layer 530 but lower than that of elastic deformable layer 510. In some embodiments, both middle layer 520 and surface conforming layer 530 will be formed by deposition of a conductive metal.

Elastic deformable layer 510 is composed, in one embodiment, of aluminum and is designed such that elastic deformable layer 510 exhibits elastic compression under the normal force of attachment between case lid 440 and a case, but returns to an approximation of its previous shape after removal of case lid 440 from the case body. In some embodiments, elastic deformable layer 510 and lid substrate 500 are formed from a single continuous piece of material. In one embodiment, surface coating 540 is composed of a conductive material, such as gold, silver or copper. In some embodiments, surface coating 540 is composed of a material used to create surface conforming layer 530. In other embodiments, surface conforming layer 530 is composed of a material different from the material used to create surface coating 540. In some embodiments, surface conforming layer 530 is composed of a material different from the material used to create surface coating 540 and different from a material used to create a coating of a case (not shown) to which lid 440 is attached.

Figure 5B:
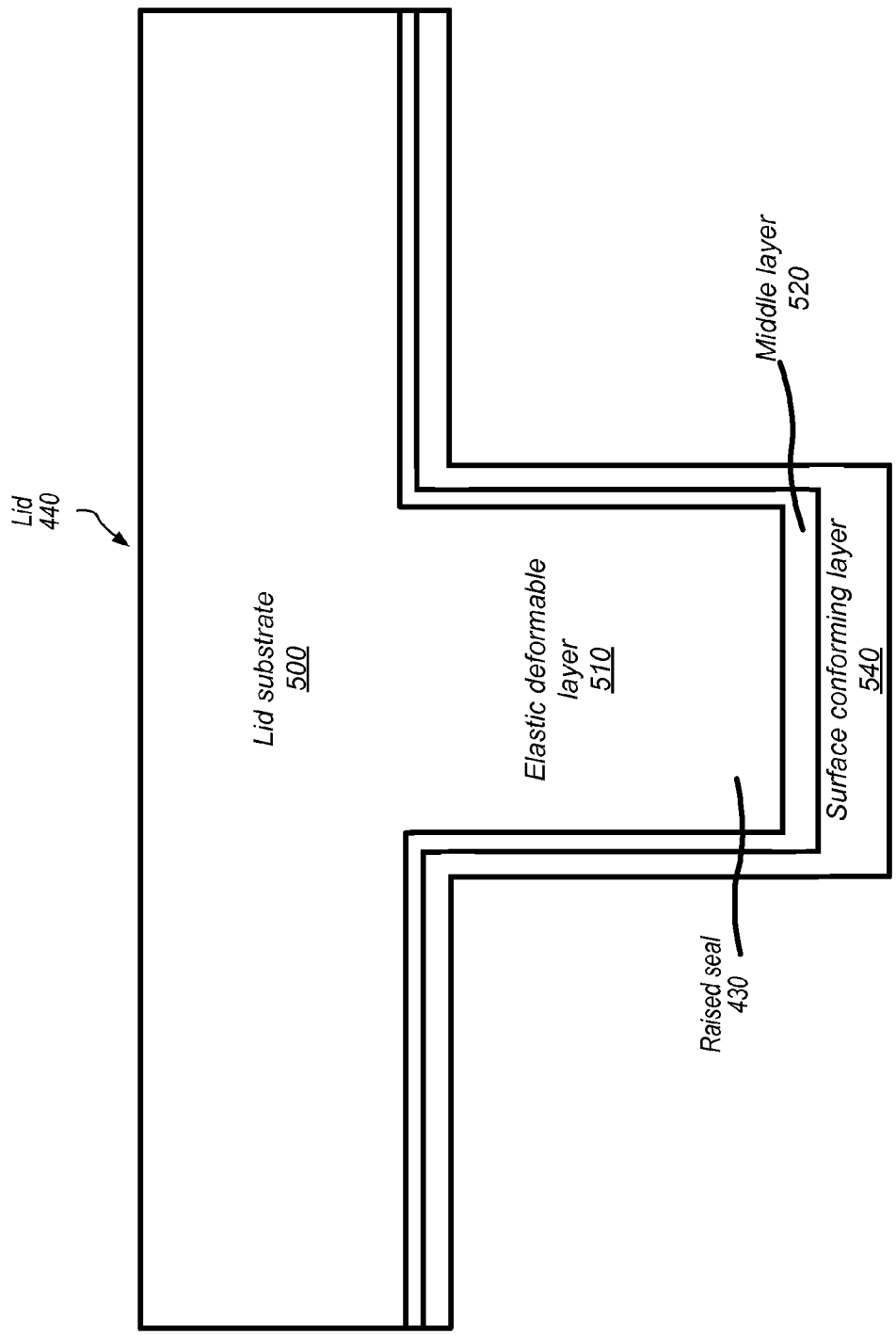
FIG. 5B illustrates a cross-section of a lid of a microcircuit case with an integrated deformable seal according to one embodiment of the present invention.

FIG. 5B illustrates a cross-section of a lid of a microcircuit case with an integrated deformable seal according to one embodiment of the present invention. As will be readily apparent to one of skill in the art in light of having read the present disclosure, for purposes of clarity in explanation, FIG. 5B is not drawn to scale. Lid 440 is composed of a lid substrate 500, a raised seal 430 arising from lid substrate 500, a middle layer 520, and a surface conforming layer 540 affixed to middle layer 520. Raised seal 430 is composed of an elastic deformable layer 510 of a single piece with lid substrate 500, a middle layer 520 affixed to elastic deformable layer 510 and lid substrate 500, and a surface conforming layer 540 affixed to middle layer 520.

In one embodiment, surface conforming layer 540 is composed of gold or silver, which is selected for its low yield strength and high electrical conductivity. As used herein, yield strength is defined as the force necessary to cause plastic deformation of a material. Surface conforming layer 540 is designed to compress and conform under the normal force of attachment to a case body of lid 440 to any irregularities in the shape of the case body (not shown) to which lid 440 is attached, and to retain an imprint of the shape of that case body for subsequent re-attachment to the case body after removal of the case body. Middle layer 520 is composed of silver or copper, which is selected on the basis of having a yield strength higher than that of surface conforming layer 540 but lower than that of elastic deformable layer 510. In some embodiments, both middle layer 520 and surface conforming layer 540 will be formed by deposition of a conductive metal.

Elastic deformable layer 510 is composed, in one embodiment, of aluminum and is designed such that elastic deformable layer 510 exhibits elastic compression under the normal force of attachment between case lid 440 and a case, but returns to an approximation of its previous shape after removal of case lid 440 from the case body. In some embodiments, elastic deformable layer 510 and lid substrate 500 are formed from a single continuous piece of material. In one embodiment, surface coating 540 is composed of a conductive material, such as gold, silver or copper.

Figure 6:
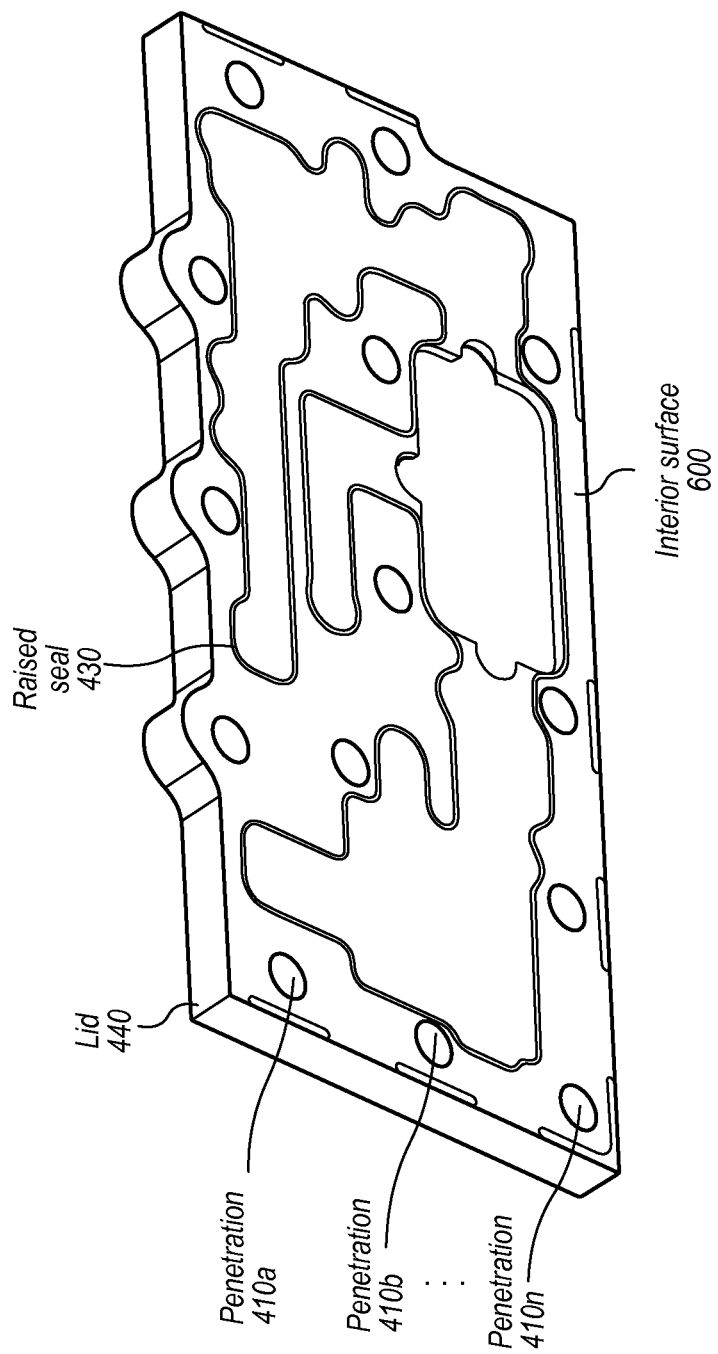
FIG. 6 depicts a bottom view of a lid of a microcircuit case with an integrated deformable seal according to one embodiment of the present invention.

FIG. 6 depicts a bottom view of a lid of a microcircuit case with an integrated deformable seal according to one embodiment of the present invention. Lid 440 includes raised seal 430 extending beyond an interior surface 600 of lid 440 in a direction orthogonal to interior surface 600 in order to contact a case or case body. Penetrations 410a-410n allow lid 440 to be affixed to the case, also referred to as a case body (not shown).

FIG. 7 illustrates a cutaway view of a microcircuit case with an installed circuit and a lid with an integrated deformable seal fitted to the case according to one embodiment of the present invention. Case body 420 (also referred to herein as a case) and lid 440 define an enclosure for housing a circuit 700. Raised seal 430 forms an enclosure perimeter between lid 440 and case body 420 around a perimeter of the enclosure housing circuit 700. When lid 440 is affixed to case body 420, a surface conforming layer (not shown) of raised seal 440 is adjacent to case body 420 along a side opposite the elastic deformable layer (not shown) of raised seal 430. Fixation of lid 440 on case body 420 generates a normal force on raised seal 430 greater than a yield strength of the surface conforming layer, and, in some embodiments, greater than a compressive strength of the elastic deformable layer but not greater than the yield strength of the elastic deformable layer. In some embodiments, the normal force is greater than the yield strength and the compressive strength of the middle layer (also not shown). In one embodiment, a material of surface conforming layer is different from a material used to coat case body 420 in order to prevent metal diffusion bonding between case body 420 and raised seal 430.

FIG. 8 depicts a cutaway view of an alternative embodiment a microcircuit case with an installed circuit and a lid with an integrated deformable seal fitted to the case according to one embodiment of the present invention. Case body 420 (also referred to herein as a case) and lid 440 define an enclosure for housing a circuit 700. Raised seal 430 forms an enclosure perimeter between lid 440 and case body 420 around a perimeter of the enclosure 810 housing circuit 700. In one embodiment, a gas-tight weld 800 results from metal diffusion between a surface conforming layer (not shown) of raised seal 430 and a coating (also not shown) of case body 420. In such an embodiment, gas-tight weld 800 results from metal diffusion between a surface conforming layer (not shown) of raised seal 430 composed of the same material as the coating (also not shown) of case body 420 adjacent to raised seal 430. Such a gas-tight weld can be used to create a barrier to the arrival of new gasses in enclosure 810. In such an embodiment, absorbers (not shown), for absorbing various chemicals, such as water vapor, can be inserted into enclosure 810 prior to affixation of lid 440 to case body 420 and can be used to remove the chemicals, such as water vapor, from air inside of enclosure 810.

Figure 9A:
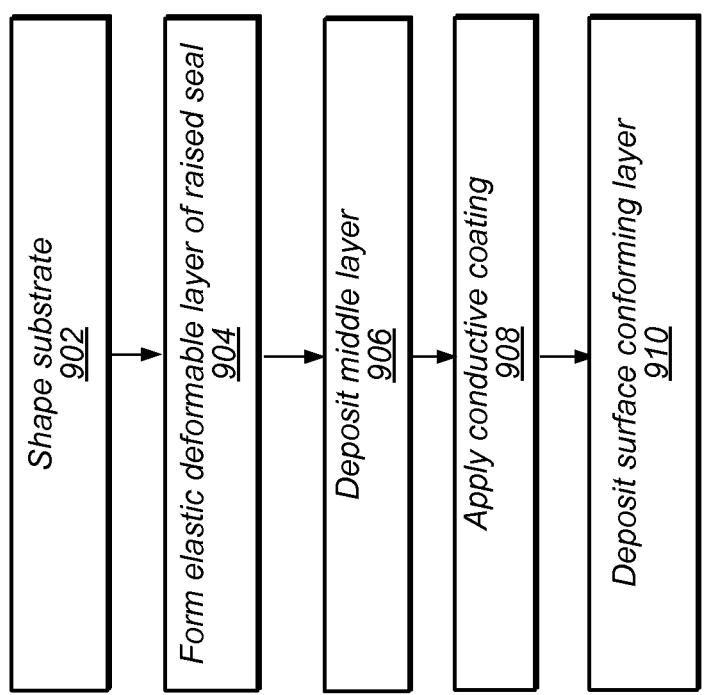
FIG. 9A depicts a method for fabricating a lid of a microcircuit case with an integrated deformable seal.

As discussed below, FIGS. 9-10 discuss methods and techniques for making and using embodiments of a measurement apparatus for inductively measuring radio-frequency signals within a microcircuit situated inside a microcircuit case FIG. 9A depicts a method for fabricating a lid of a microcircuit case with an integrated deformable seal. A substrate of a lid is shaped (block 902). In one embodiment, the substrate is formed from corundum. An elastic deformable layer of a raised seal is formed adjacent and affixed to the substrate (block 904). In embodiments in which the substrate is formed of the same material that is used to form the elastic deformable layer, the two may be executed as a single piece, either by a deposition process or by a reduction process. In embodiments in which the material composition of the substrate is different from that of the elastic deformable layer, a deposition process may be used to deposit the elastic deformable layer on the substrate. In some embodiments, the substrate is formed of aluminum and the elastic deformable layer is also formed of aluminum. In some embodiments, the elastic deformable layer forms a continuous enclosure perimeter.

Figure 9B:
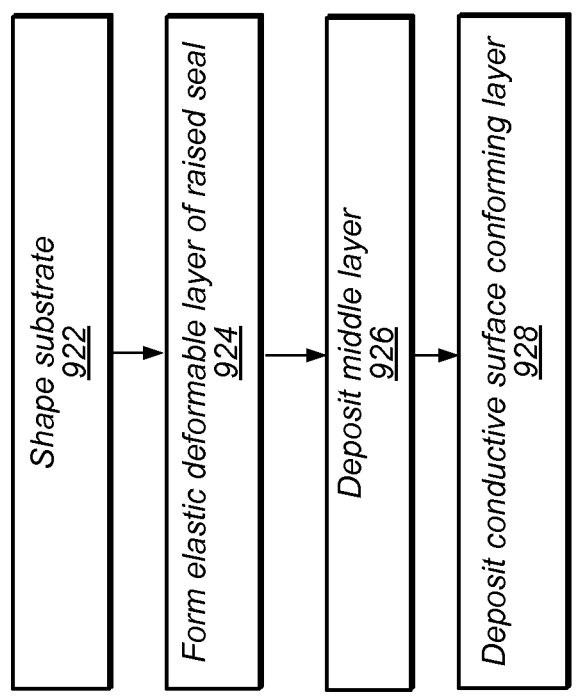
FIG. 9B illustrates an additional method for fabricating a lid of a microcircuit case with an integrated deformable seal.

FIG. 9B illustrates an additional method for fabricating a lid of a microcircuit case with an integrated deformable seal. A substrate of a lid is shaped (block 922). In one embodiment, the substrate is formed from corundum. An elastic deformable layer of a raised seal is formed adjacent and affixed to the substrate (block 924). In embodiments in which the substrate is formed of the same material that is used to form the elastic deformable layer, the two may be executed as a single piece, either by a deposition process or by a reduction process. In embodiments in which the material composition of the substrate is different from that of the elastic deformable layer, a deposition process may be used to deposit the elastic deformable layer on the substrate. In some embodiments, the substrate is formed of aluminum and the elastic deformable layer is formed of aluminum. In some embodiments, the elastic deformable layer forms a continuous enclosure perimeter.

A middle layer is deposited (block 926). In some embodiments, the middle layer forms a continuous enclosure perimeter. In some embodiments, the middle layer will be formed from a soft metal, such as silver or copper, which has a yield strength lower than the yield strength of the elastic deformable layer but higher than that of the subsequently deposited surface conforming layer. A conductive surface conforming layer is deposited (block 928). In some embodiments, the surface conforming layer forms a continuous enclosure perimeter. In one embodiment, the surface conforming layer is formed of gold or silver, which is selected for a combination of conductivity and a yield strength less than the normal force of attachment between the lid and the case or case body to which it is attached. In some embodiments, metal layers described in the present disclosure are formed by electroplating. One skilled in the art, however, will realize that embodiments involving different forms of deposition are contemplated by and do not depart from the scope of the present disclosure.

Figure 10:
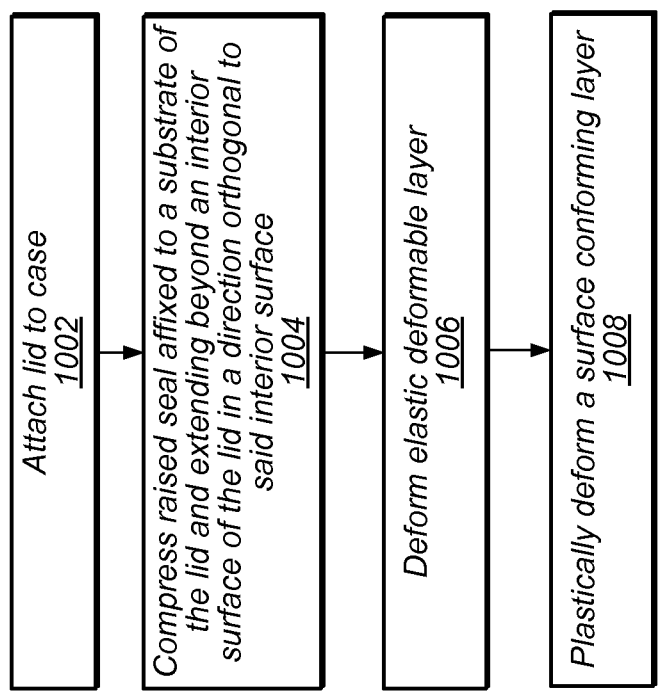
FIG. 10 depicts a method for using a lid of a microcircuit case with an integrated deformable seal.

FIG. 10 illustrates a method for using a lid of a microcircuit case with an integrated deformable seal. A lid is attached to a case (block 1002). A raised seal affixed to a substrate of the lid and extending beyond an interior surface of the lid in a direction orthogonal to the interior surface is compressed (block 1004). An elastic deformable layer is deformed (block 1006). A surface conforming layer undergoes plastic deformation (block 1008).

Although the embodiments above have been described in considerable detail, numerous variations and modifications will become apparent to those skilled in the art once the above disclosure is fully appreciated. It is intended that the following claims be interpreted to embrace all such variations and modifications. Specifically, while the description above focuses on an example that uses a raised seal integrated with a case housing a microcircuit, the principles described herein apply to any of a wide variety of sealed enclosure types. Such sealed enclosure types may be applicable to a wide variety of housings to seal a wide variety of enclosures in isolating environments. In some embodiments, the principles, methods, and apparatus described herein will be used to avoid contamination outside a case housing by effects generated inside the case (e.g., ionizing radiation particles from a particle-generating source in an isolating environment as an alternative to electromagnetic fields and inductive currents). One skilled in the art will realize, in light of having read the present disclosure, that such sealed enclosures and environments fall within the scope and intent of the present disclosure. While the leakage described herein is described as an electromagnetic field, one of skill in the relevant art will realize that probes applying the principles described herein will find use in a wide range of applications ranging from ionizing radiation to chemistry. The methods and techniques described herein may prove advantageous in any context in which a sealed case is desired to isolate an environment inside the case from an environment outside the case.

We claim:

1. An apparatus, comprising:
    a lid configured to be removably affixed to a case, wherein
        the lid comprises a substrate composed of a first material, and
        an interior surface of the lid comprises a surface coating of a second material; and
    a raised seal affixed to the substrate and extending beyond the interior surface in a direction orthogonal to the interior surface, wherein
        the raised seal comprises an elastic deformable layer adjacent to the substrate,
        the raised seal comprises a surface conforming layer configured such that, when the lid is affixed to the case, the surface conforming layer is adjacent to the case along a side opposite the elastic deformable layer, and
        the surface conforming layer is composed of a material of a yield strength less than a normal force generated by fixation of the lid to the case.

2. The apparatus of claim 1, wherein the surface conforming layer is composed of the second material.

3. The apparatus of claim 1, wherein the surface conforming layer is composed of a material used to form a layer of the case adjacent to the surface conforming layer at the fixation of the lid to the case.

4. The apparatus of claim 3, further comprising a gas-tight weld between the surface conforming layer and the layer of the case adjacent to the surface conforming layer caused by metal diffusion bonding.

5. The apparatus of claim 3, wherein the fixation of the lid to the case causes metal diffusion bonding between the surface conforming layer and the layer of the case adjacent to the surface conforming layer.

6. The apparatus of claim 3, wherein the surface conforming layer is composed of a material different from the second material.

7. The apparatus of claim 1, wherein the raised seal extends along a continuous enclosure perimeter between the lid and the case.

8. The apparatus of claim 1, wherein the surface conforming layer is composed of a material different from the second material and from a material used to form a layer of the case adjacent to the surface conforming layer at the fixation of the lid to the case.

9. The apparatus of claim 1, wherein the surface conforming layer is composed of a material different from a material used to form a layer of the case adjacent to the surface conforming layer at the fixation of the lid to the case.

10. The apparatus of claim 1, wherein the elastic deformable layer is composed of the first material.

11. The apparatus of claim 1, wherein
    a compressive strength of the elastic deformable layer is less than the normal force generated by fixation of the lid to the case, and
    the normal force generated by the fixation of the lid to the case is less than a yield strength of the elastic deformable layer.

12. The apparatus of claim 1, further comprising, a middle layer affixed adjacent to the elastic deformable layer along a side opposite the substrate and affixed adjacent to the surface conforming layer along a side opposite the case, wherein the middle layer is composed of a third material.

13. The apparatus of claim 12, wherein
    the third material is of a yield strength greater than a yield strength of the surface conforming layer, and
    the third material is of a compressive strength less than a yield strength of the elastic deformable layer.

14. The apparatus of claim 1, wherein the surface conforming layer comprises a conductive metal.

15. A method of fabricating a lid seal, the method comprising
    fabricating a lid configured to be removably affixed to a case, wherein
        the fabricating the lid comprises shaping a substrate composed of a first material, and
        the fabricating the lid further comprises coating an interior surface of the lid with a surface coating of a second material;
    forming a raised seal affixed to the substrate and extending beyond the interior surface in a direction orthogonal to the interior surface, wherein
        forming the raised seal further comprises generating an elastic deformable layer adjacent to the substrate,
        forming the raised seal further comprises depositing a surface conforming layer configured such that, when the lid is affixed to the case, the surface conforming layer is adjacent to the case along a side opposite the elastic deformable layer, wherein depositing the surface conforming layer further comprises depositing a material of a yield strength less than a normal force generated by fixation of the lid to the case.

16. The method of claim 15, wherein the forming the raised seal further comprises depositing a middle layer affixed adjacent to the elastic deformable layer along a side opposite the substrate and affixed adjacent to the surface conforming layer along a side opposite the case, wherein the middle layer is composed of a third material.

17. The method of claim 16, wherein the depositing the middle layer further comprises depositing a third material of a compressive strength greater than a compressive strength of the surface conforming layer and less than a compressive strength of the elastic deformable layer.

18. The method of claim 15, wherein the forming the raised seal further comprises forming a seal extending along a continuous enclosure perimeter between the lid and the case.

19. A method for sealing a case,
  attaching to a case a lid;
  compressing a raised seal affixed to a substrate of the lid and extending beyond an interior surface of the lid in a direction orthogonal to the interior surface;
  deforming an elastic deformable layer adjacent to the substrate;
  plastically deforming a surface conforming layer configured such that, when the lid is affixed to the case, the surface conforming layer is adjacent to the case along a side opposite the elastic deformable layer and composed of a material of a yield strength less than a normal force generated by fixation of the lid to the case; and
  locking the lid in place.

20. The method of claim 19, wherein the compressing the raised seal further comprises generating a metal diffusion bond between the case and the surface conformable layer.

* * * * *